US00RE42642E

(19) United States
(12) Reissued Patent
Sato et al.

(10) Patent Number: US RE42,642 E
(45) Date of Reissued Patent: Aug. 23, 2011

(54) IMAGING LENS

(75) Inventors: Kenichi Sato, Saitama (JP); Minoru Taniyama, Saitama (JP)

(73) Assignee: Fujinon Corporation, Saitama-Shi (JP)

(21) Appl. No.: 12/397,270

(22) Filed: Mar. 3, 2009

Related U.S. Patent Documents

Reissue of:
(64) Patent No.: 7,342,729
Issued: Mar. 11, 2008
Appl. No.: 11/727,606
Filed: Mar. 27, 2007

(30) Foreign Application Priority Data

Mar. 28, 2006 (JP) ..... 2006-087410

(51) Int. Cl.
*G02B 13/04* (2006.01)
*G02B 13/18* (2006.01)

(52) U.S. Cl. ..... 359/753; 359/716

(58) Field of Classification Search ..... 359/716, 359/753

See application file for complete search history.

(56) References Cited

U.S. PATENT DOCUMENTS

| | | | | |
|---|---|---|---|---|
| 6,961,191 | B2 | 11/2005 | Sato | |
| 6,985,306 | B2 | 1/2006 | Abe | |
| 7,110,188 | B2 | 9/2006 | Matsui et al. | |
| 7,262,925 | B2 | 8/2007 | Huang | |
| 7,375,903 | B2 * | 5/2008 | Taniyama | 359/715 |
| 2001/0028511 | A1 | 10/2001 | Sensui | |
| 2004/0190162 | A1 | 9/2004 | Sato | |
| 2005/0041306 | A1 | 2/2005 | Matsuo | |

FOREIGN PATENT DOCUMENTS

| | | | |
|---|---|---|---|
| EP | 1 348 990 | A1 | 10/2003 |
| JP | 2004-226487 | | 8/2004 |
| JP | 2004-302058 | A | 10/2004 |
| JP | 2005-173319 | A | 6/2005 |
| JP | 2005-227755 | A | 8/2005 |
| JP | 2005-292235 | A | 10/2005 |

* cited by examiner

*Primary Examiner* — Scott J Sugarman
(74) *Attorney, Agent, or Firm* — Birch, Stewart, Kolasch & Birch, LLP

(57) ABSTRACT

An imaging lens comprises, in order from an object side:
a first lens having a positive refractive power;
a second lens having a negative refractive power whose concave surface faces to the object; and
a third lens having a positive refractive power and having a meniscus form that has a convex surface, facing to the object, in a portion at and around an optical axis of the imaging lens;
wherein the first, second and third lenses have at least one aspheric surface, and
wherein the imaging lens satisfies conditional expressions given below:

$$0.7<f1/f<1.3 \quad (1)$$

$$0.3<D2/f<0.5 \quad (2)$$

$$1.0<|f2/f|<3.0 \quad (3)$$

$$1.2<f3/f<4.0 \quad (4)$$

where
f: a focal length of an overall system,
f1: a focal length of the first lens,
f2: a focal length of the second lens,
f3: a focal length of the third lens, and
D2: a spacing, on the optical axis, between the first lens and the second lens.

4 Claims, 9 Drawing Sheets

EXAMPLE 1

EXAMPLE 3

EXAMPLE 4

FIG. 5A

| | EXAMPLE 1, BASIC LENS DATA | | | | |
|---|---|---|---|---|---|
| | Si (SURFACE NUMBER) | Ri (RADIUS OF CURVATURE) | Di (SURFACE-TO-SURFACE SPACING) | Ndj (REFRACTIVE INDEX) | νdj (ABBE NUMBER) |
| G1 | 1 | 2.435 | 0.77 | 1.532 | 55.4 |
| | 2 | −205.532 | 1.50 | | |
| G2 | 3 | −0.998 | 0.58 | 1.604 | 27.2 |
| | 4 | −1.433 | 0.09 | | |
| G3 | 5 | 2.040 | 1.29 | 1.532 | 55.4 |
| | 6 | 2.511 | 0.70 | | |
| GC | 7 | ∞ | 0.30 | 1.516 | 64.1 |
| | 8 | ∞ | 0.70 | | |

(f=4.62mm, FNO.=2.8)

FIG. 5B

| EXAMPLE 1, ASPHERIC DATA | | | |
|---|---|---|---|
| ASPHERIC COEFFICIENT | SURFACE NO. | | |
| | FIRST SURFACE | SECOND SURFACE | THIRD SURFACE |
| K | 2.011E+00 | 1.261E+03 | −1.679E+00 |
| $A_3$ | −1.480E−02 | −2.675E−03 | 5.341E−02 |
| $A_4$ | 1.122E−02 | −1.252E−02 | −1.916E−01 |
| $A_5$ | −3.718E−02 | −1.814E−02 | −6.108E−03 |
| $A_6$ | 2.739E−03 | −2.216E−04 | 8.122E−02 |
| $A_7$ | 1.810E−02 | 9.964E−03 | 4.338E−02 |
| $A_8$ | −1.286E−02 | 1.433E−02 | −2.367E−02 |
| $A_9$ | −9.712E−03 | −5.557E−02 | −3.654E−02 |
| $A_{10}$ | 5.317E−03 | 3.366E−02 | 2.160E−02 |
| | FOURTH SURFACE | FIFTH SURFACE | SIXTH SURFACE |
| K | 2.902E−01 | −1.365E+01 | 7.265E−01 |
| $A_3$ | 1.073E−02 | 2.444E−02 | 1.997E−02 |
| $A_4$ | −6.594E−02 | −3.784E−02 | −1.096E−01 |
| $A_5$ | 2.899E−02 | 5.300E−03 | 2.359E−02 |
| $A_6$ | 3.957E−02 | 7.758E−03 | 1.295E−02 |
| $A_7$ | 3.930E−03 | −4.300E−04 | −4.866E−03 |
| $A_8$ | −5.311E−03 | −1.329E−03 | −1.455E−03 |
| $A_9$ | −4.061E−04 | −1.736E−04 | 8.164E−04 |
| $A_{10}$ | 5.843E−04 | 1.537E−04 | −1.122E−04 |

FIG. 6A

| | EXAMPLE 2, BASIC LENS DATA | | | | |
|---|---|---|---|---|---|
| | Si (SURFACE NUMBER) | Ri (RADIUS OF CURVATURE) | Di (SURFACE-TO-SURFACE SPACING) | Ndj (REFRACTIVE INDEX) | νdj (ABBE NUMBER) |
| G1 | 1 | 2.114 | 1.05 | 1.509 | 56 |
| | 2 | −440.182 | 1.06 | | |
| G2 | 3 | −1.214 | 0.80 | 1.608 | 25.2 |
| | 4 | −2.221 | 0.37 | | |
| G3 | 5 | 1.807 | 1.15 | 1.509 | 56 |
| | 6 | 2.460 | 0.70 | | |
| GC | 7 | ∞ | 0.30 | 1.516 | 64.1 |
| | 8 | ∞ | 0.83 | | |

(f=4.95mm, FNO. =2.8)

FIG. 6B

| EXAMPLE 2, ASPHERIC DATA | | | |
|---|---|---|---|
| ASPHERIC COEFFICIENT | SURFACE NO. | | |
| | FIRST SURFACE | SECOND SURFACE | THIRD SURFACE |
| K | 1.171E+00 | 9.967E+01 | −3.524E+00 |
| $A_3$ | −4.699E−03 | −5.555E−03 | −2.037E−02 |
| $A_4$ | 6.261E−03 | −3.675E−04 | −2.307E−01 |
| $A_5$ | −2.155E−02 | −3.436E−02 | −7.634E−03 |
| $A_6$ | 3.824E−03 | −2.444E−03 | 1.021E−01 |
| $A_7$ | 8.696E−03 | 2.598E−02 | 7.063E−02 |
| $A_8$ | −7.004E−03 | 1.015E−02 | −2.609E−02 |
| $A_9$ | −1.901E−03 | −8.466E−02 | −7.511E−02 |
| $A_{10}$ | −6.893E−04 | 5.655E−02 | 3.453E−02 |
| | FOURTH SURFACE | FIFTH SURFACE | SIXTH SURFACE |
| K | 1.899E−01 | −5.800E+00 | 4.010E−01 |
| $A_3$ | −3.899E−02 | −1.486E−02 | 2.662E−02 |
| $A_4$ | −7.059E−02 | −5.058E−02 | −1.229E−01 |
| $A_5$ | 2.008E−02 | 1.390E−02 | 2.822E−02 |
| $A_6$ | 3.782E−02 | 1.082E−02 | 1.308E−02 |
| $A_7$ | 3.362E−03 | −6.947E−04 | −5.238E−03 |
| $A_8$ | −5.377E−03 | −1.907E−03 | −1.434E−03 |
| $A_9$ | 2.428E−04 | −3.422E−04 | 9.406E−04 |
| $A_{10}$ | 5.494E−04 | 2.332E−04 | −1.468E−04 |

FIG. 7A

| | EXAMPLE 3, BASIC LENS DATA | | | | |
|---|---|---|---|---|---|
| | Si (SURFACE NUMBER) | Ri (RADIUS OF CURVATURE) | Di (SURFACE-TO-SURFACE SPACING) | Ndj (REFRACTIVE INDEX) | νdj (ABBE NUMBER) |
| G1 | 1 | 2.469 | 0.66 | 1.532 | 55.4 |
| | 2 | 14.902 | 1.90 | | |
| G2 | 3 | -1.117 | 0.46 | 1.604 | 27.2 |
| | 4 | -1.691 | 0.07 | | |
| G3 | 5 | 1.484 | 1.40 | 1.532 | 55.4 |
| | 6 | 1.920 | 0.70 | | |
| GC | 7 | ∞ | 0.30 | 1.516 | 64.1 |
| | 8 | ∞ | 0.54 | | |

(f=4.61mm, FNO.=2.8)

FIG. 7B

| EXAMPLE 3, ASPHERIC DATA | | | |
|---|---|---|---|
| ASPHERIC COEFFICIENT | SURFACE NO. | | |
| | FIRST SURFACE | SECOND SURFACE | THIRD SURFACE |
| K | 2.411E+00 | 2.214E+01 | -4.486E+00 |
| $A_3$ | -4.950E-03 | 1.476E-02 | -6.721E-05 |
| $A_4$ | 1.406E-02 | -2.251E-02 | -1.639E-01 |
| $A_5$ | -5.192E-02 | -2.179E-02 | -1.066E-02 |
| $A_6$ | 2.123E-02 | 3.079E-02 | 6.130E-02 |
| $A_7$ | 2.244E-02 | 4.870E-02 | 2.972E-02 |
| $A_8$ | -1.755E-02 | -5.674E-03 | -2.007E-02 |
| $A_9$ | -6.456E-03 | -1.257E-01 | -2.482E-02 |
| $A_{10}$ | 2.203E-03 | 7.891E-02 | 1.672E-02 |
| | FOURTH SURFACE | FIFTH SURFACE | SIXTH SURFACE |
| K | 2.090E-01 | -8.084E+00 | 3.997E-01 |
| $A_3$ | -3.731E-02 | 2.710E-03 | 4.508E-02 |
| $A_4$ | -5.427E-02 | -3.262E-02 | -1.503E-01 |
| $A_5$ | 1.819E-02 | 9.145E-03 | 3.337E-02 |
| $A_6$ | 2.702E-02 | 7.634E-03 | 1.698E-02 |
| $A_7$ | -2.444E-03 | -8.718E-04 | -5.034E-03 |
| $A_8$ | -6.377E-03 | -1.399E-03 | -1.894E-03 |
| $A_9$ | 7.642E-04 | -1.300E-04 | 6.685E-04 |
| $A_{10}$ | 2.024E-03 | 1.517E-04 | -5.001E-05 |

FIG. 8A

| EXAMPLE 4, BASIC LENS DATA | | | | | |
|---|---|---|---|---|---|
| | Si (SURFACE NUMBER) | Ri (RADIUS OF CURVATURE) | Di (SURFACE-TO-SURFACE SPACING) | Ndj (REFRACTIVE INDEX) | νdj (ABBE NUMBER) |
| G1 | 1 | 2.983 | 0.65 | 1.532 | 55.4 |
| | 2 | 54.553 | 2.10 | | |
| G2 | 3 | −1.137 | 0.42 | 1.604 | 27.2 |
| | 4 | −1.631 | 0.07 | | |
| G3 | 5 | 1.427 | 1.37 | 1.532 | 55.4 |
| | 6 | 1.835 | 0.70 | | |
| GC | 7 | ∞ | 0.30 | 1.516 | 64.1 |
| | 8 | ∞ | 0.54 | | |

(f=4.52mm, FNO.=2.8)

FIG. 8B

| EXAMPLE 4, ASPHERIC DATA | | | |
|---|---|---|---|
| ASPHERIC COEFFICIENT | SURFACE NO. | | |
| | FIRST SURFACE | SECOND SURFACE | THIRD SURFACE |
| K | 2.736E+00 | 2.214E+01 | −5.479E+00 |
| $A_3$ | −1.455E−02 | −1.906E−03 | −3.157E−03 |
| $A_4$ | 2.229E−02 | 1.138E−03 | −1.665E−01 |
| $A_5$ | −4.945E−02 | −1.642E−02 | −1.326E−02 |
| $A_6$ | 2.400E−02 | −1.300E−02 | 6.027E−02 |
| $A_7$ | 4.649E−03 | 5.838E−02 | 3.017E−02 |
| $A_8$ | −9.080E−03 | −2.376E−04 | −1.912E−02 |
| $A_9$ | −2.262E−03 | −1.037E−01 | −2.427E−02 |
| $A_{10}$ | 2.776E−03 | 7.092E−02 | 1.590E−02 |
| | FOURTH SURFACE | FIFTH SURFACE | SIXTH SURFACE |
| K | 3.511E−01 | −7.954E+00 | 3.742E−01 |
| $A_3$ | −2.822E−02 | 1.066E−02 | 4.415E−02 |
| $A_4$ | −5.932E−02 | −3.381E−02 | −1.502E−01 |
| $A_5$ | 1.484E−02 | 8.350E−03 | 3.317E−02 |
| $A_6$ | 2.553E−02 | 7.699E−03 | 1.705E−02 |
| $A_7$ | −3.068E−03 | −8.351E−04 | −4.904E−03 |
| $A_8$ | −6.536E−03 | −1.368E−03 | −1.973E−03 |
| $A_9$ | 9.161E−04 | −1.238E−04 | 6.680E−04 |
| $A_{10}$ | 2.413E−03 | 1.433E−04 | −4.809E−05 |

FIG. 9

| CONDITIONAL-EXPRESSION RELATED VALUE | | | | | |
|---|---|---|---|---|---|
| | CONDITIONAL EXPRESSION (1) f1/f | CONDITIONAL EXPRESSION (2) D2/f | CONDITIONAL EXPRESSION (3) \|f2 / f\| | CONDITIONAL EXPRESSION (4) f3 / f | CONDITIONAL EXPRESSION (5) ν1 − ν2 |
| EXAMPLE 1 | 0. 98 | 0. 32 | 2. 37 | 2. 27 | 28. 2 |
| EXAMPLE 2 | 0. 84 | 0. 21 | 1. 27 | 1. 69 | 30. 8 |
| EXAMPLE 3 | 1. 18 | 0. 41 | 1. 69 | 1. 26 | 28. 2 |
| EXAMPLE 4 | 1. 31 | 0. 46 | 2. 02 | 1. 23 | 28. 2 |

EXAMPLE 1

SPHERICAL ABERRATION

ASTIGMATISM

DISTORTION

EXAMPLE 2

SPHERICAL ABERRATION

ASTIGMATISM

DISTORTION

EXAMPLE 3

SPHERICAL ABERRATION

ASTIGMATISM

DISTORTION

EXAMPLE 4

SPHERICAL ABERRATION

ASTIGMATISM

DISTORTION

IMAGING LENS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an imaging lens to be mounted on an imaging apparatus, e.g. a digital still camera, a camera-equipped cellular phone or a personal digital assistant (PDA), that uses an imaging device, such as a CCD (charge coupled device) or a CMOS (complementary metal oxide semiconductor).

2. Description of the Related Art

Recently, size reduction and pixel-density increase have advanced conspicuously for the imaging devices, such as of CCDs and CMOSs. This in turn requires an imager proper and a lens for mount thereon, that are smaller in size but higher in performance. For size reduction, there is a need to reduce the overall length and the height (diametrical reduction orthogonal to the optical axis). Meanwhile, besides size reduction, the imaging optical system generally is required to have a telecentricity, i.e. characteristic to place the main rays of light incident upon the imaging device at an angle nearly parallel with the optical axis (incident angle upon the image plane nearly zero relative to the normal line to the image plane). In order to secure a telecentricity, it is advantageous to arrange an optical aperture stop in a position as close as possible to the object. JP-A-2005-292235 describes an imaging lens having totally three lenses wherein its optical aperture stop is arranged in a position closest to the object. Meanwhile, JP-A-2004-302058 discloses an imaging lens having totally three lenses wherein its optical aperture stop is arranged at between the first lens and the second lens.

In the meanwhile, as pixel-density increases for the imager, there is a trend required for the imager for taking a still image to provide a mechanical shutter in order to reduce signal noises at the imager. Where providing a shutter, it is advantageous to arrange it in a position close to the optical aperture stop in order to reduce the unevenness of light amount. Meanwhile, for an imaging lens arranged with three lenses, the optical aperture stop is advantageously arranged in a position as close as possible to the object, e.g. in a position in front or back of the first lens, in order to secure a telecentricity as noted above. However, it is unadvantageous to arrange the shutter mechanism in front of the first lens or closest to the object, in respect of size reduction. For this reason, it can be contemplated to provide a shutter mechanism in a position inside the lens system, i.e. at between the first and second lenses. For this purpose, there is a desire to develop a lens having a high aberrational performance compatible with pixel-density increase while securing sufficiently an air-spacing at between the first and second lenses, in order to arrange a shutter mechanism in an imaging lens arranged with three lenses. JP-A-2005-292235 includes example 3 that a spacing is secured comparatively broad at between the first and second lenses, thus providing a lens arrangement advantageous in arranging a shutter mechanism. However, there is a desire for developing a lens which is more advantageous in shutter mechanism arrangement and higher in aberrational performance than that structure.

SUMMARY OF THE INVENTION

The present invention has been made in view of the foregoing problem, and it is an object thereof to provide a small-sized high-performance imaging lens that an interspacing is secured sufficiently to arrange a shutter mechanism therein while maintaining a high aberrational performance compatible with pixel-density increase.

An imaging lens comprises, in order from an object side: a first lens having a positive refractive power; a second lens having a negative refractive power whose concave surface faces to the object; and a third lens having a positive refractive power and having a meniscus form that has a convex surface, facing to the object, in a portion at and around an optical axis of the imaging lens; wherein the first, second and third lenses have at least one aspheric surface, and wherein the imaging lens satisfies conditional expressions given below:

$$0.7<f1/f<1.3 \quad (1)$$

$$0.3<D2/f<0.5 \quad (2)$$

$$1.0<|F2/f|<0.3 \quad (3)$$

$$1.2<f3/f<4.0 \quad (4)$$

where f: a focal length of an overall system, f1: a focal length of the first lens, f2: a focal length of the second lens, f3: a focal length of the third lens, and D2: a spacing, on the optical axis, between the first lens and the second lens.

The imaging lens of the invention can be reduced in size by providing the lenses with a proper form and refractive power through use of a lens arrangement having totally three lenses. Meanwhile, by satisfying the conditional expression (2), a spacing can be secured broad at between the first lens and the second lens. This is advantageous in arranging a shutter mechanism therein. Meanwhile, by satisfying the conditional expressions (1), (3) and (4), power distribution is optimized over the lenses, thus maintaining a high aberrational performance compatible with pixel-density increase.

In the imaging lens of the invention, preferably a conditional expression given below is further satisfied:

$$20<\nu1-\nu2 \quad (5)$$

where $\nu1$: Abbe number of the first lens, and $\nu2$: Abbe number of the second lens.

Meanwhile, in the imaging lens of the invention, preferably the first lens has an object-side surface made in a convex form in a portion at and around the optical surface and an image-side surface made in an aspheric form having a positive refractive power increasing as a peripheral portion thereof is neared, the second lens being in a meniscus form in a portion at and around the optical axis. This makes it easy to satisfy the conditional expressions, thus easily improving the performance.

BRIEF DESCRIPTION OF THE DRAWINGS

FIGS. 5A and 5B are figures showing the lens data of an imaging lens according to example 1 of the invention, wherein FIG. 5A shows the basic lens data and FIG. 5B shows the lens data concerning an aspheric surface;

FIGS. 6A and 6B are figures showing the lens data of an imaging lens according to example 2 of the invention, wherein FIG. 6A shows the basic lens data and FIG. 6B shows the lens data concerning an aspheric surface;

FIGS. 7A and 7B are figures showing the lens data of an imaging lens according to example 3 of the invention, wherein FIG. 7A shows the basic lens data and FIG. 7B shows the lens data concerning an aspheric surface;

FIGS. 8A and 8B are figures showing the lens data of an imaging lens according to example 4 of the invention, wherein FIG. 8A shows the basic lens data and FIG. 8B shows the lens data concerning an aspheric surface;

FIG. 9 shows a figure showing, collectively on each example, the values related to the conditional expressions FIGS. 10A to 10C are aberration diagrams showing the aberrations of the imaging lens according to example 1 of the invention, wherein FIG. 10A shows a spherical aberration, FIG. 10B shows an astigmatism and FIG. 10C shows a distortion;

FIGS. 11A to 11C are aberration diagrams showing the aberrations of the imaging lens according to example 2 of the invention, wherein FIG. 11A shows a spherical aberration, FIG. 11B shows an astigmatism and FIG. 11C shows a distortion;

FIGS. 12A to 12C are aberration diagrams showing the aberrations of the imaging lens according to example 3 of the invention, wherein FIG. 12A shows a spherical aberration, FIG. 12B shows an astigmatism and FIG. 12C shows a distortion; and FIGS. 13A to 13C are aberration diagrams showing the aberrations of the imaging lens according to example 4 of the invention, wherein FIG. 13A shows a spherical aberration, FIG. 13B shows an astigmatism and FIG. 13C shows a distortion.

DETAILED DESCRIPTION OF THE INVENTION

With reference to the drawings an embodiment of the present invention will now be explained in detail.

Figure 1:
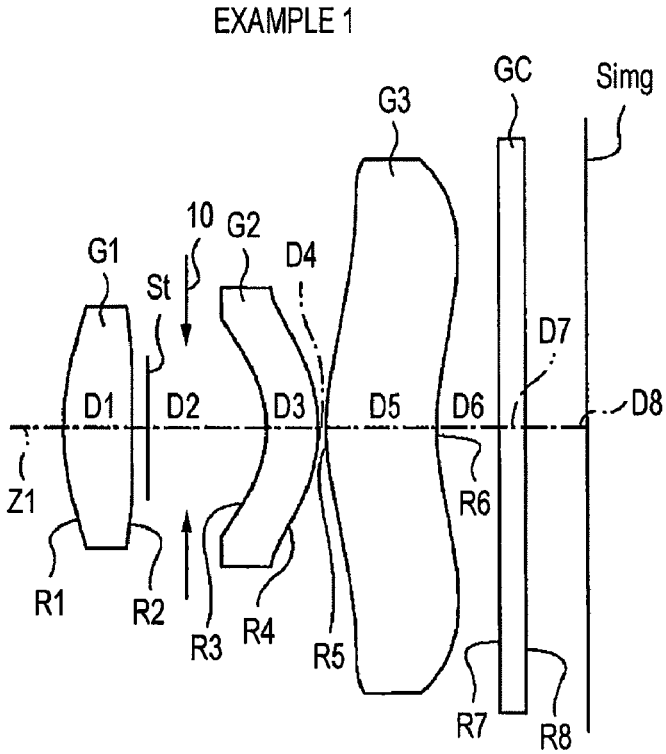
FIG. 1 is a lens sectional view corresponding to an imaging lens according to example 1 of the invention.
Figure 2:
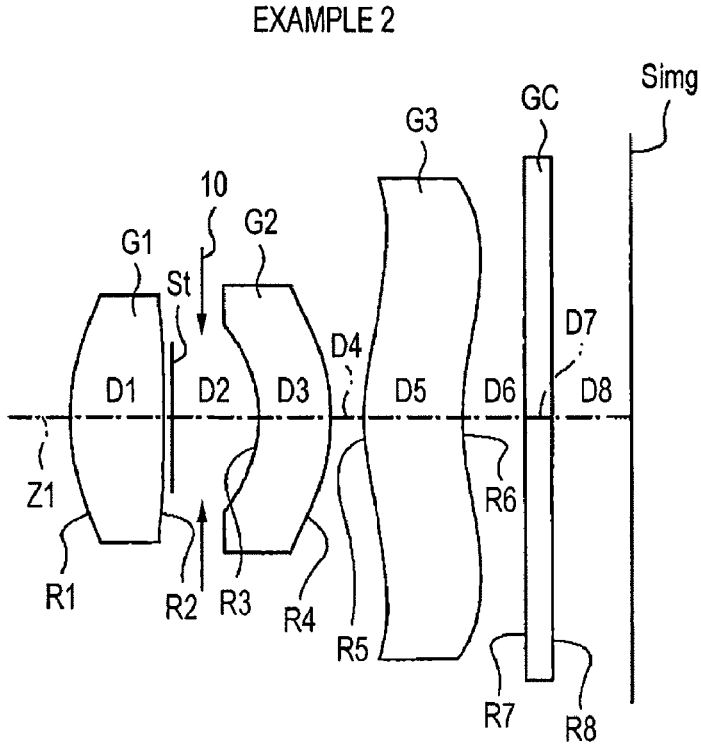
FIG. 2 is a lens sectional view corresponding to an imaging lens according to example 2 of the invention.
Figure 3:
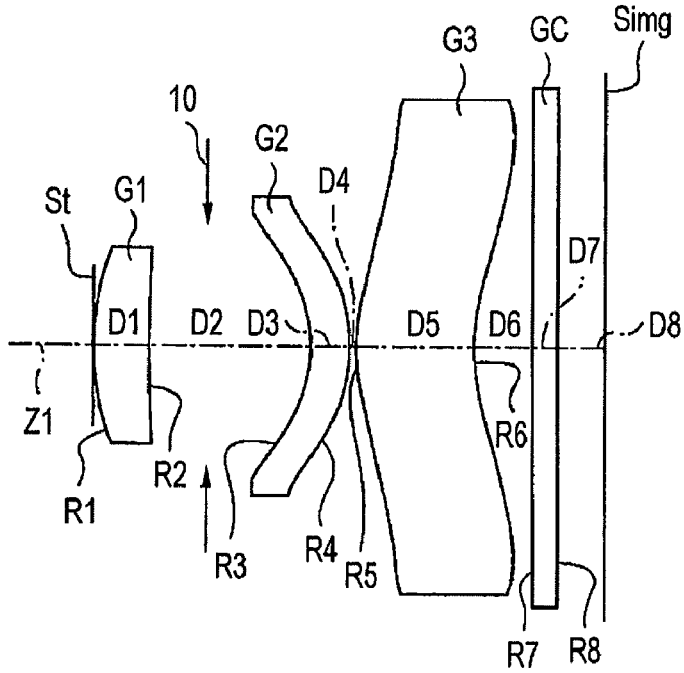
FIG. 3 is a lens sectional view corresponding to an imaging lens according to example 3 of the invention.
Figure 4:
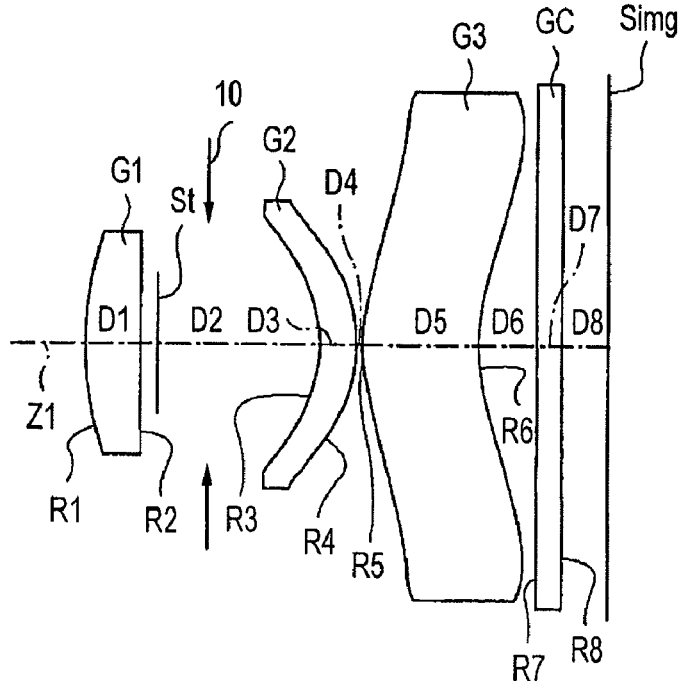
FIG. 4 is a lens sectional view corresponding to an imaging lens according to example 4 of the invention.

FIG. 1 shows a first arrangement example of an imaging lens according to an embodiment of the invention. This arrangement example corresponds to the lens arrangement in a first numerical example (FIGS. 5A and 5B), referred later. FIG. 2 shows a second arrangement example wherein this arrangement example corresponds to the lens arrangement of a second numerical example (FIGS. 6A, 6B), referred later. FIG. 3 shows a third arrangement example wherein this arrangement example corresponds to the lens arrangement of a third numerical example (FIGS. 7A, 7B), referred later. FIG. 4 shows a fourth arrangement example wherein this arrangement example corresponds to the lens arrangement of a fourth numerical example (FIGS. 8A, 8B), referred later. In FIGS. 1 to 4, reference numeral Ri represents a radius-of-curvature of an i-th surface whose subscript is provided to increase as the image is neared provided that the constituent element closest to the object has a surface taken as the first. Reference numeral Di represents a surface-to-surface spacing between the i-th and (i+1)-th surfaces on an optical axis Z1. Note that the explanation below is basically on the first arrangement example shown in FIG. 1 because the arrangements are similar one to another in respect of the basic structure.

The imaging lens is suitable for use in various imaging appliances using imaging devices such as of CCD and CMOS, e.g. digital still cameras, camera-equipped cellular phone and personal digital assistants. The imaging lens includes a first lens G1, a second lens G2 and a third lens G3, in the closer order to the object on the optical axis Z1. At least one of the surfaces of the first, second and third lenses G1, G2, G3 is made aspheric.

An optical aperture stop St is preferably arranged as close as possible to the object, in order to secure a telecentricity. In the arrangement examples of FIGS. 1, 2 and 4, an aperture stop St is arranged in back of the first lens Gl. In the FIG. 3 arrangement example, an aperture stop St is arranged in front of the first lens G1, i.e. in a position of the lens system closest to the object. A shutter 10 is arranged between the first lens G1 and the second lens G2.

An imaging device, such as a CCD, is arranged on an image surface Simg of the imaging lens. Between the third lens G3 and the imaging device, various optical members GC are arranged in accordance with the camera structure the relevant lens is to be mounted. For example, plate-like optical members are arranged which include an image-surface-protecting cover glass and an infrared-blocking filter.

The first lens G1 has a positive refractive power. The first lens G1 has a surface, close to the object, made convex in an area nearby the optical axis. In the arrangement examples of FIGS. 1 and 2, the first lens G1 is made convex in form at both surfaces in areas nearby the optical axis, wherein the image-side surface is made in an aspheric form where positive refractive power increases as the periphery is neared. In the arrangement examples of FIGS. 3 and 4, the first lens G1 is made as a positive meniscus form whose convex surface faces, in its area nearby the optical surface, to the object.

The second lens G2 has a concave surface facing to the object, thus having a negative refractive power. The second lens G2 is preferably in a meniscus form in an area nearby the optical axis. This makes it easy to satisfy the numerical range of conditional expression (3), referred later.

The third lens G3 is made in a positive meniscus form having a convex surface facing to the object, in an area nearby the optical axis. The third lens G3 is a lens arranged closest to the image surface. Accordingly, in the third lens G3, luminous flux is separated at each angle-of-view as compared to the first and second lenses G1, G2. By properly using the aspheric surface in the third lens G3, aberration can be easily corrected at each angle-of-view, thus making it easy to correct for curvature-of-field and distortion. In addition, a telecentricity can be easily secured. For this reason, the image-side surface of the third lens G3 is preferably made concave in an area nearby the optical axis and convex at the peripheral area thereof.

The imaging lens satisfies the following conditions, wherein f is a focal length of the system overall, f1 is a focal length of the first lens G1, f2 is a focal length of the second lens G2, f3 is a focal length of the third lens G3, and D2 is a spacing between the first lens G1 and the second lens G2 on the optical axis Z1.

$$0.7<f1/f<1.3 \quad (1)$$

$$0.3<D2/f<0.5 \quad (2)$$

$$1.0<|f2/f|<3.0 \quad (3)$$

$$1.2<f3/f<4.0 \quad (4)$$

The imaging lens preferably satisfies further the following conditional expression. In the expression, ν1 is an Abbe number of the first lens G1 and ν2 is an Abbe number of the second lens G2.

$$20<\nu1-\nu2 \quad (5)$$

Description is now made on the operation and effect of the imaging lens constructed as above.

The imaging lens can provide a lens system that is advantageous in reducing the overall length and securing a telecentricity by virtue of the aperture stop St arranged in front or back of the first lens through use of the arrangement of as less as three lenses in total. Furthermore, by satisfying the conditional expressions, optimization is achieved for the material of and the power distribution over the lenses, thus sufficiently securing an interspacing for arranging a shutter mechanism therein while maintaining a high aberrational performance compatible with pixel-density increase. Meanwhile, in the imaging lens, aberration can be corrected further effectively by optimizing the aspheric surfaces. In order to cope with an imaging device having high pixel density, there is a need to provide a telecentricity, i.e. characteristic to place the main rays of light incident upon the imaging device at an angle nearly parallel with the optical axis (incident angle upon the image plane nearly zero relative to the normal line to the image plane). In the imaging lens, the image-side surface of the third lens G3 which is the final lens surface closest to the imaging device for example is made concave toward the image in an area nearby the optical axis and convex toward the image in a peripheral area thereof, aberration can be properly corrected at each angle-of-view thus regulating the angle of an incident luminous flux upon the imaging device. This makes it possible to relieve the unevenness of light amount over the entire image surface, and provides an advantage in correcting for curvature-of-field and distortion.

The conditional expression (1) concerns the focal length f1 of the first lens G1. In case exceeding the numerical range of the same, the power of the first lens G1 is excessively small thus making it difficult to reduce the overall length. Meanwhile, in case going below the same, corrections are difficult for curvature-of-field and astigmatism and further the angle-at-exit-pupil is provided unpreferably excessively great.

The conditional expression (2) concerns the spacing D2 between the first lens G1 and the second lens G2 and the overall focal length f. In case exceeding the numerical range of the same, it is difficult to reduce the overall length. Meanwhile, in case going below the same, the spacing D2 cannot be secured sufficiently between the first lens G1 and the second lens G2, thus unpreferably making it difficult to arrange a shutter mechanism.

The conditional expression (3) concerns the focal length f2 of the second lens G2. In case the numerical range is exceeded, the power of the second lens G2 is excessively small, thus making it difficult to reduce the overall length. Meanwhile, in case going below the same, corrections are unpreferably difficult for curvature-of-field, astigmatism and so on. The conditional expression (4) concerns the focal length f3 of the third lens G3. In case going out any of the upper and lower limits of the numerical range, power is out of balance with the second lens G2 thus unpreferably snaking it difficult to correct for aberrations while maintaining the overall length short. The conditional expression (5) concerns the Abbe number of the first and second lenses G1, G2. In case going below the numerical range of the same, chromatic aberration cannot be unpreferably corrected to a sufficient extent.

As explained so far, according to the imaging lens of the embodiment, predetermined conditional expressions are satisfied by means of the arrangement having lenses as less as three in total, thus optimizing the form, refractive power and arrangement of the lenses. This can realize a lens system small in size but high in performance wherein interspacing is sufficiently secured to arrange a shutter mechanism therein while maintaining a high aberrational performance compatible with pixel-density increase.

EXAMPLES

Now explanation is made on concrete numerical examples of the imaging lens in the present embodiment. First to fourth numerical examples are explained collectively in the following.

FIGS. 5A and 5B show, as example 1, the concrete lens data corresponding to the FIG. 1 imaging lens arrangement. Particularly, FIG. 5A shows the basic lens data while FIG. 5B shows the data concerning aspheric surfaces. In the column of the surface number Si of the lens data shown in FIG. 5A, the surface of the constituent element closest to the object is taken as the first, to show the number of the i-th (i=1-8) surface given with a symbol gradually increasing as the image end is neared. In the column of the radius-of-curvature Ri, shown is a value of radius-of-curvature (mm) of the i-th surface as counted in the closer order to the object correspondingly to the symbol Ri attached in FIG. 1. In the column of the surface-to-surface spacing Di, shown is a spacing (mm) on the optical axis between the i-th surface Si and the (i+1)-th surface (Si+1) as similarly counted in the closer order to the object. Ndj represents a value of refractive index at d-line (wavelength: 587.6 nm) of the optical element as counted in the closer order to the object. In the column of vdj, shown is an Abbe number at d-line of the optical element located j-th in the closer order to the object. FIG. 5A also shows the values of overall-system paraxial focal length f (mm) and F-number (FNO.), as various ones of data.

The imaging lens in example 1 is made all aspheric in form at both surfaces of the first, second and third lenses G1, G2, G3. In the basic lens data in FIG. 5A, the aspheric surfaces are shown with numerals of radius-of-curvature in an area at or around the optical axis. In the numeral shown as aspheric data in FIG. 5B, the symbol "E" represents that the following numeral is a "power exponent" having a bottom of 10 wherein the numeral represented by an exponential function, having such a bottom 10, is to be multiplied on the numeral preceding "E". For example, "1.0E−02" if given represents "$1.0\times10^{-2}$".

The aspheric data is described with the values of coefficients $A_n$, K that are given in an aspheric-form expression represented by the following expression (A). Specifically, Z represents the length (mm) of a vertical line drawn from a point, on the aspheric surface and located at a height h with respect to the optical axis Z1, onto a tangential plane to the apex of the aspheric surface (a plane vertical to the optical axis Z1). The imaging lens in example 1 is expressed by effectively using third-to-tenth order coefficients $A_3$-$A_{10}$ on the assumption the spherical surfaces are of respective aspheric coefficients $A_n$.

$$Z=C\cdot h^2/\{1+(1-K\cdot C^2\cdot h^2)^{1/2}\}+\Sigma A_n\cdot h^n \quad (A)$$

(n: integer equal to or greater than 3)

where

Z: depth of the aspheric surface (mm)

h: distance (height) of from the optical surface to the lens surface (mm)

K: eccentricity (second-order aspheric coefficient)

C: paraxial curvature=1/R (R: paraxial radius-of-curvature)

$A_n$: n-th aspheric coefficient

Similarly to the imaging lens of example 1, FIGS. 6A and 6B show, as example 2, the concrete lens data corresponding to the imaging lens arrangement shown in FIG. 2. Likewise, FIGS. 7A and 7B show, as example 3, the concrete lens data corresponding to the imaging lens arrangement shown in FIG. 3. Likewise, FIGS. 8A and 8B show, as example 4, the concrete lens data corresponding to the imaging lens arrangement shown in FIG. 4. Incidentally, concerning any one of the imaging lenses of examples 2 to 4, the first, second and third lenses G1, G2, G3 are made aspheric in form at both surfaces thereof similarly to example 1.

FIG. 9 shows collectively the values related to the foregoing conditional expressions. As seen from FIG. 9, the examples have values fallen within the numeral ranges of the respective conditional expressions.

Figure 10A:
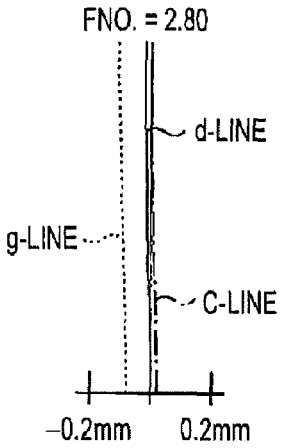
Figure 10B:
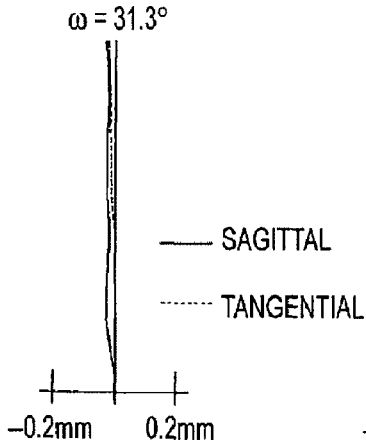
Figure 10C:
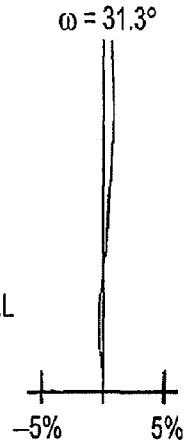

FIGS. 10A to 10C respectively show a spherical aberration, an astigmatism and a distortion, of the imaging lens of example 1. In the aberration diagrams, aberrations are shown at d-line as a reference wavelength. In the spherical aberration diagram, also shown are aberrations at g-line (wavelength: 435.8 nm) and at C-line (wavelength: 656.3 nm). In the astigmatism diagram, the solid line represents an aberration in a sagittal direction while the broken line an aberration in a tangential direction, wherein FNO. represents an F value while ω represents a half angle-of-view.

Figure 11A:
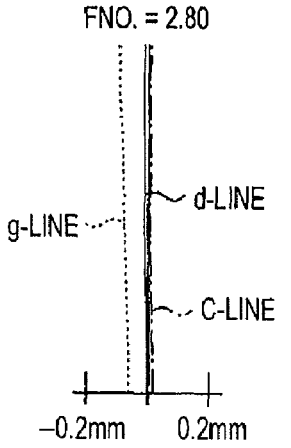
Figure 11B:
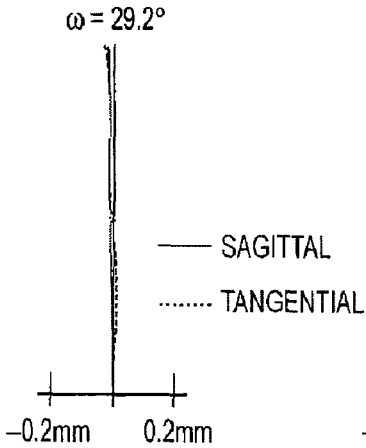
Figure 11C:
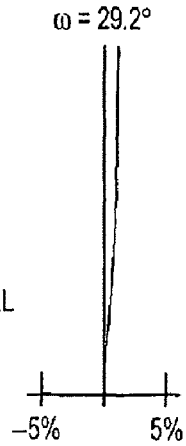
Figure 12A:
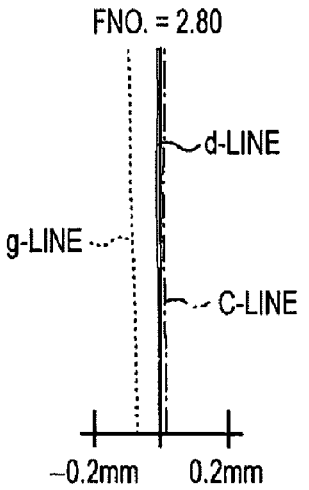
Figure 12B:
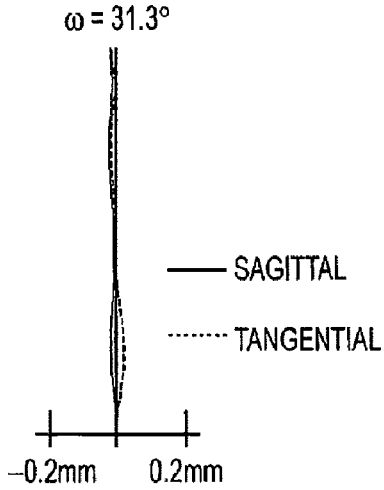
Figure 12C:
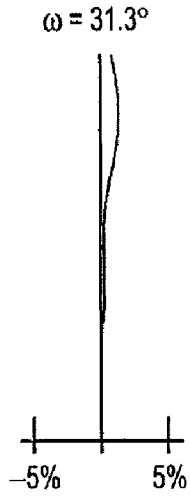
Figure 13A:
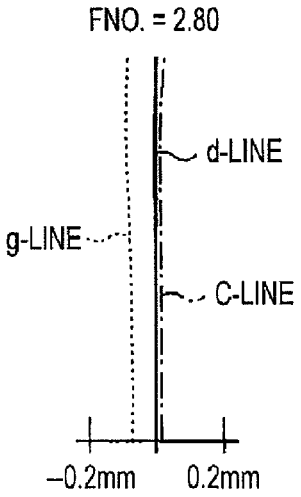
Figure 13B:
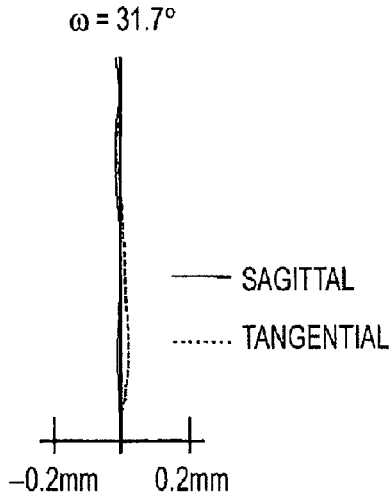
Figure 13C:
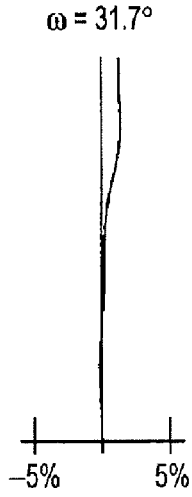

Likewise, FIGS. 11A-11C show the aberrations as to the imaging lens of example 2, FIGS. 12A-12C show the aberrations as to the imaging lens of example 3, and FIGS. 13A-13C show the aberrations as to the imaging lens of example 4.

As can be seen from the numerical-value data and the aberration diagrams, optimization is achieved for the lens material, the lens surface form and the power distribution over lenses in each example by the totally three-lens arrangement, thus realizing an imaging lens system smaller in size but higher in performance wherein interspacing is sufficiently secured to arrange a shutter mechanism therein.

The invention is not limited to the embodiment and examples but can be modified in various ways. For example, the radius-of-curvature, the surface-to-surface spacing, the refractive index, etc. of the lenses are not limited to the values but can take other values.

According to the imaging lens of the invention, by satisfying predetermined conditional expressions through use of an arrangement of as less as totally three lenses, optimization is achieved for the form, refractive power and arrangement of the lenses. Thus, a small-sized high-performance lens system can be realized secured sufficiently with an interspacing to arrange a shutter mechanism therein while maintaining a high aberrational performance compatible with pixel-density increase.

The entire disclosure of each and every foreign patent application from which the benefit of foreign priority has been claimed in the present application is incorporated herein by reference, as if fully set forth.

What is claimed is:

1. An imaging lens comprising, in order from an object side:

a first lens having a positive refractive power;

a second lens having a negative refractive power whose concave surface faces to the object; and a third lens having a positive refractive power and having a meniscus form that has a convex surface, facing to the object, in a portion at and around an optical axis of the imaging lens;

wherein the first, second and third lenses have at least one aspheric surface, and wherein the imaging lens satisfies conditional expressions given below:

$$0.7<f1/f<1.3 \quad (1)$$

$$[0.3<D2/f<0.5 \quad (2)]$$

$$0.21\leq D2/f<0.5 \quad (2')$$

$$1.0<|f2/f|<3.0 \quad (3)$$

$$1.2<f3/f<4.0 \quad (4)$$

where f: a focal length of an overall system, f1: a focal length of the first lens, f2: a focal length of the second lens, f3: a focal length of the third lens, and D2: a spacing, on the optical axis, between the first lens and the second lens.

2. An imaging lens according to claim 1, wherein a conditional expression given below is further satisfied:

$$20<\nu1-\nu2 \quad (5)$$

where

ν1: Abbe number of the first lens, and

ν2: Abbe number of the second lens.

3. An imaging lens according to claim 1, wherein the first lens has: an object-side surface having a convex form in a portion at and around the optical axis; and an image-side surface having all aspheric form and having a positive refractive power increasing as a peripheral portion thereof is neared, and the second lens has a meniscus form in a portion at and around the optical axis.

4. An imaging lens according to claim 2, wherein the first lens has: an object-side surface having a convex form in a portion at and around the optical axis; and an image-side surface having an aspheric form and having a positive refractive power increasing as a peripheral portion thereof is neared, and the second lens has a meniscus form in a portion at and around the optical axis.

* * * * *